(12) United States Patent
Endozo et al.

(10) Patent No.: US 9,876,344 B2
(45) Date of Patent: Jan. 23, 2018

(54) APPARATUS AND METHODS FOR MONITORING AND RESPONDING TO POWER SUPPLY AND/OR DETECTION CIRCUIT FAILURES WITHIN AN ELECTRONIC CIRCUIT BREAKER

(71) Applicant: Siemens Industry, Inc., Alpharetta, GA (US)

(72) Inventors: Joselito Endozo, Dacula, GA (US); Hugh T. Kinsel, Sugar Hill, GA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 230 days.

(21) Appl. No.: 14/729,325

(22) Filed: Jun. 3, 2015

(65) Prior Publication Data

US 2016/0141862 A1   May 19, 2016

Related U.S. Application Data

(60) Provisional application No. 62/080,481, filed on Nov. 17, 2014.

(51) Int. Cl.

| H02H 3/16 | (2006.01) |
|---|---|
| H02H 3/04 | (2006.01) |
| H01H 9/54 | (2006.01) |
| H01H 69/00 | (2006.01) |
| H01H 83/02 | (2006.01) |

(52) U.S. Cl.
CPC ............... *H02H 3/16* (2013.01); *H01H 9/54* (2013.01); *H01H 69/00* (2013.01); *H01H 83/02* (2013.01); *H02H 3/044* (2013.01)

(58) Field of Classification Search
CPC ............ H02H 3/16; H02H 3/044; H01H 9/54; H01H 69/00; H01H 83/02
See application file for complete search history.

(56) References Cited

U.S. PATENT DOCUMENTS

| 5,742,513 A | 4/1998 | Bouhenguel et al. |
|---|---|---|
| 8,908,338 B2 | 12/2014 | Kinsel |
| 8,908,339 B2 | 12/2014 | Kinsel |

(Continued)

FOREIGN PATENT DOCUMENTS

| CN | 1858881 A | 11/2006 |
|---|---|---|
| CN | 101013808 A | 8/2007 |
| EP | 2182604 A1 | 5/2010 |

OTHER PUBLICATIONS

European Search Report dated Mar. 31, 2016 corresponding to European Application No. 15194425.3 filed Nov. 13, 2015 (8 pages).

*Primary Examiner* — Scott Bauer

(57) ABSTRACT

An electronic circuit breaker may include a monitoring circuit configured to monitor and respond to a power supply and/or detection circuit failure within the electronic circuit breaker. In some embodiments, the monitoring circuit may monitor a regulated DC voltage provided by the detection circuit within the electronic circuit breaker. A response to a power supply and/or detection circuit failure may include interrupting current flow between an electrical power source and an electrical circuit protected by the electronic circuit breaker. Methods of monitoring and responding to a power supply and/or detection circuit failure within an electronic circuit breaker are also provided, as are other aspects.

20 Claims, 5 Drawing Sheets

(56) References Cited

U.S. PATENT DOCUMENTS

| | | |
|---|---|---|
| 8,929,036 B2 | 1/2015 | Nayak et al. |
| 2007/0165342 A1* | 7/2007 | Elms ........................ H02H 3/05 |
| | | 361/42 |
| 2012/0057266 A1 | 3/2012 | Kasztenny |
| 2014/0268434 A1* | 9/2014 | Simonin .............. H02H 1/0092 |
| | | 361/42 |

* cited by examiner

APPARATUS AND METHODS FOR MONITORING AND RESPONDING TO POWER SUPPLY AND/OR DETECTION CIRCUIT FAILURES WITHIN AN ELECTRONIC CIRCUIT BREAKER

RELATED APPLICATION

This claims the benefit of U.S. Provisional Patent Application No. 62/080,481, filed Nov. 17, 2014 and titled "Method And Apparatus To Monitor Power Supply And IC Or ASIC Failure In Ground Fault Or Arc Fault Circuit Interrupters Or Dual Function Interrupters," the disclosure of which is hereby incorporated by reference herein in its entirety for all purposes.

FIELD

The invention relates generally to electronic circuit breakers and, more particularly, to monitoring and responding to power supply and/or detection circuit failures within an electronic circuit breaker.

BACKGROUND

Electronic circuit breakers may be used in some electrical systems to protect an electrical circuit coupled to an electrical power source from one or more fault conditions. One type of electronic circuit breaker may be a ground fault circuit interrupter (GFCI). GFCIs may be used to prevent electrical shock hazards and are typically used in electrical circuits adjacent to water, such as in bathrooms and/or kitchens. Another type of electronic circuit breaker may be an arc fault circuit interrupter (AFCI). AFCIs may interrupt power to an electrical circuit when an arcing condition within the electrical circuit is detected. GFCIs and AFCIs may also detect other fault conditions such as, e.g., persistent over current and/or short circuit fault conditions. A third type of electronic circuit breaker may be referred to as a dual function circuit breaker, which combines a GFCI and an AFCI. Upon sensing of a fault condition, a trip mechanism within the electronic circuit breaker may be activated to interrupt current flow from the electrical power source to the protected electrical circuit.

An electronic circuit breaker may include an internal power supply that may convert a large AC voltage (e.g., 120 VAC) received from an electrical power source into a low DC voltage. The low DC voltage may be used to power various circuits within the electronic circuit breaker. The various circuits may include integrated circuits (ICs) and/or application specific integrated circuits (ASICs) that perform, e.g., ground fault and/or arc fault detection. However, if a power supply or detection circuit within the electronic circuit breaker fails (because of, e.g., an electrostatic discharge (ESD), a power surge, or a latch-up condition), the fault detection capability of the electronic circuit breaker may be compromised. This may result in a dangerous situation wherein a fault condition may occur in an electrical circuit, but the electrical circuit may remain energized because the electronic circuit breaker may be unable to detect and respond to the fault condition.

To help avoid such a dangerous situation, some known electronic circuit breakers may include a manual test feature, wherein a push-to-test (PTT) button, usually located on the face of the device, can be manually pressed to check that the electronic circuit breaker is operating properly. However, because such manual testing may not be performed, other known electronic circuit breakers may employ an automatic self-test or monitoring feature. Such a feature may automatically check the functionality of the electronic circuit breaker every two or three hours, for example. But if the internal power supply fails, the automatic self-test or monitoring feature may also fail, again resulting in a dangerous situation wherein a fault condition may occur, but the electrical circuit may remain energized.

Accordingly, there is a need for apparatus and methods that monitor and respond to power supply and/or detection circuit failures within an electronic circuit breaker.

SUMMARY

According to one aspect, an electronic circuit breaker is provided that includes a trip switch configured to open and close a current path between an electrical power source and an electrical circuit; a detection circuit configured to detect and respond to a fault condition in the electrical circuit, the detection circuit configured to respond to a fault condition by causing the trip switch to open the current path between the electrical power source and the electrical circuit; a power supply configured to convert an AC voltage received from the electrical power source into a first DC voltage, the power supply providing the first DC voltage to the detection circuit; and a monitoring circuit configured to monitor and respond to a power supply or detection circuit failure within the electronic circuit breaker, wherein the monitoring circuit is configured to respond to the power supply or detection circuit failure by causing the trip switch to open the current path between the electrical power source and the electrical circuit.

According to another aspect, a method of assembling an electronic circuit breaker configured to monitor and respond to a power supply and/or a detection circuit failure within the electronic circuit breaker is provided. The method includes electrically coupling a trip switch between a source terminal and a load terminal, the trip switch configured to open and close a current path in a power conductor between the source terminal and the load terminal; electrically coupling an input of a power supply to the power conductor, the power supply configured to convert an AC voltage into a first DC voltage and comprising a first DC voltage output; electrically coupling a detection circuit to the first DC voltage output, the detection circuit comprising a second DC voltage output; and electrically coupling a monitoring circuit to the power supply input and to the second DC voltage output, wherein the monitoring circuit is configured to respond to a power supply or detection circuit failure by causing the trip switch to open the current path between the source terminal and the load terminal.

According to a further aspect, a method of detecting and responding to a power supply and/or a detection circuit failure within an electronic circuit breaker is provided. The method includes monitoring a DC voltage within the electronic circuit breaker, and responding to a drop in the DC voltage below a predetermined voltage level by causing a trip switch to open a current path between a source terminal and a load terminal of the electronic circuit breaker.

Still other aspects, features, and advantages of the invention may be readily apparent from the following detailed description wherein a number of example embodiments and implementations are described and illustrated, including the best mode contemplated for carrying out the invention. The invention may also include other and different embodiments, and its several details may be modified in various respects, all without departing from the scope of the invention.

Accordingly, the drawings and descriptions are to be regarded as illustrative in nature, and not as restrictive. The invention covers all modifications, equivalents, and alternatives of the aspects disclosed herein.

BRIEF DESCRIPTION OF DRAWINGS

Persons skilled in the art will understand that the drawings, described below, are for illustrative purposes only. The drawings are not necessarily drawn to scale and are not intended to limit the scope of this disclosure in any way.

DETAILED DESCRIPTION

Reference will now be made in detail to the example embodiments of this disclosure, which are illustrated in the accompanying drawings. Wherever possible, the same reference numbers will be used throughout the drawings to refer to the same or like parts.

The aforementioned deficiencies of some electronic circuit breakers may be overcome by one or more embodiments of the invention. In one aspect, an electronic circuit breaker may include a monitoring circuit configured to monitor an operating mode of a power supply and/or a detection circuit within the electronic circuit breaker. The power supply may provide a DC voltage to power the detection circuit and/or other electronics of the electronic circuit breaker. The monitoring circuit may be fabricated as an integrated circuit (IC) and, in some embodiments, may monitor an internally regulated DC voltage that is output from the detection circuit, which may itself be an IC or an application specific integrated circuit (ASIC). Should the power supply or detection circuit fail, the monitoring circuit may detect the loss of voltage at the monitored DC voltage output of the detection circuit and may respond by activating a trip mechanism of the electronic circuit breaker. The trip mechanism may be activated in some embodiments by electrically coupling voltage (e.g., 120 VAC) from an electrical power source to the gate of an SCR (silicon-controlled rectifier) or TRIAC (triode for alternating current) within the electronic circuit breaker to energize a trip solenoid or electromagnet of the trip mechanism. Activating the trip mechanism may interrupt current flow from the electrical power source to an electrical circuit protected by the electronic circuit breaker. The monitoring circuit may thus prevent a dangerous situation from occurring wherein a fault condition occurs, but the electronic circuit breaker may be unable to respond because of a power supply and/or detection circuit failure, which may leave the electrical circuit dangerously energized.

In other aspects, methods of monitoring and responding to a power supply and/or detection circuit failure within an electronic circuit breaker are provided, as will be explained in greater detail below in connection with FIGS. 1A-4.

Figure 1A:
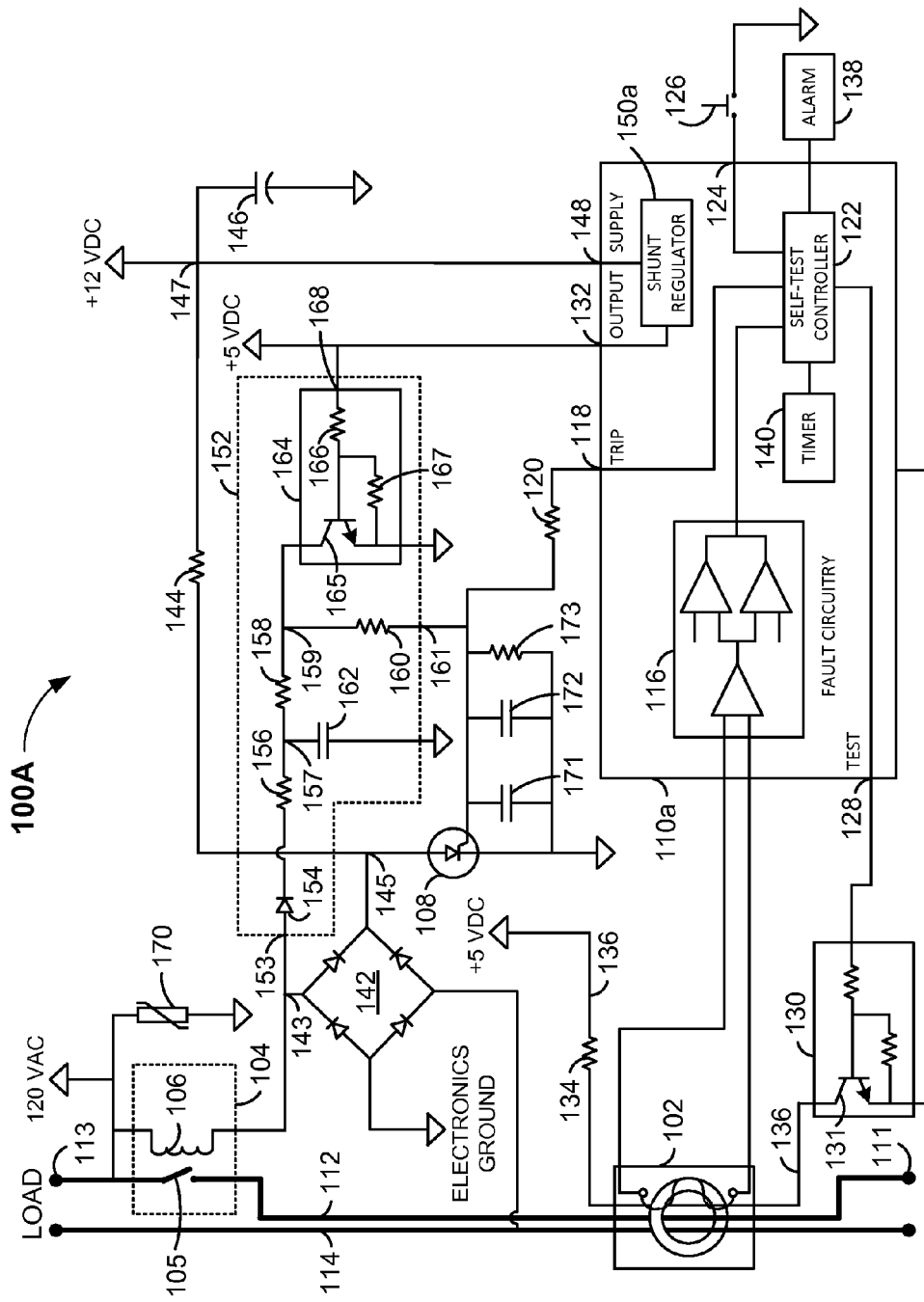
FIG. 1A illustrates a schematic circuit diagram of a first electronic circuit breaker according to embodiments.

FIG. 1A illustrates an electronic circuit breaker 100A in accordance with one or more embodiments. Electronic circuit breaker 100A may be a ground fault circuit interrupter (GFCI) coupled between an AC electrical power source and an electrical circuit (respectively labeled "SOURCE" and "LOAD" in FIG. 1A). The SOURCE may provide, e.g., 120 VAC, and the LOAD may be an electrical circuit including, e.g., one or more appliances, lighting fixtures, and/or other electrical equipment. In some embodiments, the SOURCE may provide other values of AC voltage.

Electronic circuit breaker 100A may include a current transformer 102, a trip mechanism 104, an SCR (silicon-controlled rectifier) 108, and a detection circuit 110a, which may be fabricated as, or part of, an ASIC. Detection circuit 110a may be configured to detect ground faults and/or, alternatively or additionally, other types of fault conditions, such as, e.g., arc faults, over currents, and/or short circuits. Current transformer 102 may be coupled to a power conductor 112 and a neutral conductor 114. Trip mechanism 104 may include a trip switch 105 and a trip solenoid 106, wherein trip switch 105 may be configured to electrically couple and decouple AC power from the SOURCE to the LOAD via power conductor 112 (i.e., trip switch 105 may be configured to open and close a current path in power conductor 112 between the SOURCE and the LOAD). During normal operation (i.e., where no fault conditions are detected), trip switch 105 may be closed, electrically coupling the SOURCE to the LOAD.

Current transformer 102 may be configured to sense a current imbalance between power conductor 112 and neutral conductor 114. A current imbalance may indicate a fault condition. The sensed current imbalance may be electrically coupled to detection circuit 110a, where it may be amplified and compared to a predetermined value at fault circuitry 116. If the current imbalance exceeds the predetermined value, a trip signal may be output from detection circuit 110a at a trip pin 118. The trip signal may be electrically coupled via a resistor 120 to a gate of SCR 108, causing SCR 108 to turn on (i.e., to conduct current). In some embodiments, resistor 120 may be about 4.02 k ohms, but may alternatively have other suitable values. SCR 108 may be a surface mount device having a current rating sufficient to energize trip solenoid 106 and may have a maximum gate trigger current of 200 uA. In some embodiments, SCR 108 may be, e.g., Part No. S6X8BSRP manufactured by Littlefuse, Inc. of Chicago, Ill. Other suitable SCRs may be used instead. When energized by SCR 108, trip solenoid 106 may cause trip switch 105 to open, electrically disconnecting the SOURCE from the LOAD.

Detection circuit 110a may include a self-test controller 122 configured to monitor a push-to-test (PTT) pin 124. When a manually-operated PTT button 126 is pressed, PTT pin 124 may be electrically coupled to an electronics ground potential of electronic circuit breaker 100. In response to self-test controller 122 sensing that PTT pin 124 is electrically coupled to electronics ground potential, a signal may be momentarily output at a test pin 128, which may be electrically coupled to transistor switch 130 and, in particular, to the base of NPN transistor 131. In some embodiments, transistor switch 130 may be, e.g., Part No. DTC144EMT2L by Rohm Co., Ltd., of Kyoto, Japan. Other transistor switches suitable for switching applications as described herein may be used instead. The signal from test pin 128 may cause NPN transistor 131 to turn on (i.e., conduct current), which may allow a test current to flow from a DC output pin 132 at detection circuit 110a. A regulated DC voltage, which may be about +5 VDC in some embodiments, may be provided at DC output pin 132, as described in more detail further below. Other suitable DC voltages may alternatively be provided at DC output pin 132. The test current may flow through a resistor 134 and current transformer 102 via a conductor 136, and then through NPN transistor 131 to electronics ground potential. In some embodiments, resistor 134 may be about 620 ohms, which may set the test current amplitude to about 8 mA. Resistor 134 may have other suitable values.

The induced test current may create a current imbalance that may be sensed by current transformer 102 and detected by fault circuitry 116 as described above. If fault circuitry 116 successfully detects the induced test current imbalance as, e.g., a ground fault, then a trip signal may be output from detection circuit 110a at trip pin 118 to cause trip switch 105 to open as described above. If fault circuitry 116 fails to detect the induced test current imbalance as a fault condition, then no trip signal may be output from detection circuit 110a at trip pin 118, indicating that the PTT has failed. In response, self-test controller 122 may output a signal to an alarm 138 to alert a user (e.g., a homeowner) that electronic circuit breaker 100A should be replaced. Alarm 138 may provide one or more audible tones and/or visual indications such as, e.g., one or more illuminated warning lamps or LEDs (not shown).

In some embodiments, self-test controller 122 of detection circuit 110a may also be configured to periodically initiate an automatic self-test of fault circuitry 116 by monitoring a timer 140. As described above for a PTT, a signal may be momentarily output at test pin 128, which is electrically coupled to the base of NPN transistor 131. The outputted signal may cause NPN transistor 131 to turn on, which may allow a test current to flow via conductor 136 from DC output pin 132 through resistor 134 and current transformer 102, and through transistor switch 130 to electronics ground potential. This may create a current imbalance that may be sensed by current transformer 102 and detected by fault circuitry 116 as described above. During this time, the trip signal output coupled to trip pin 118 from self-test controller 122 may be disabled so as to not cause trip switch 105 to electrically disconnect the SOURCE from the LOAD. If the automatic self-test passes the test criteria, then normal operation of detection circuit 110a may continue. However, if the automatic self-test fails the test criteria, then self-test controller 122 may output a signal to alarm 138 as described above and/or may output a trip signal at trip pin 118 to trip electronic circuit breaker 100, electrically disconnecting the SOURCE from the LOAD, as also described above.

Electronic circuit breaker 100A may also include an internal power supply configured to convert an AC voltage received from the SOURCE into a DC voltage for use within electronic circuit breaker 100A. The power supply may include a full wave bridge rectifier 142, a resistor 144, and a capacitor 146. In some embodiments, full wave bridge rectifier 142 may be, e.g., Part No. LMB10S by Micro Commercial Components Corp., of Chatsworth, Calif. Other suitable full wave bridge rectifiers may be used instead. Full wave bridge rectifier 142 may be electrically coupled at node 143 to receive an AC voltage (which may be, e.g., 120 VAC) from the SOURCE. The DC output voltage of full wave bridge rectifier 142 at node 145 may be electrically coupled via resistor 144 to a supply pin 148 of detection circuit 110a. Detection circuit 110a may have an internal shunt regulator 150a configured to regulate the voltage received at supply pin 148 to about +12 VDC in some embodiments. Capacitor 146, which has one terminal electrically coupled to supply pin 148 of detection circuit 110a and the other terminal electrically coupled to electronics ground potential, may charge quickly through resistor 144 upon power on of electronic circuit breaker 100A. The value of resistor 144 may be selected such that capacitor 146 can be charged to about +12 VDC within a few of milliseconds. The value of capacitor 146 may be selected such that enough charge can be held to maintain a voltage on supply pin 148 high enough to keep internal shunt regulator 150a in regulation during the voltage nulls that are output by full wave bridge rectifier 142. In some embodiments, the value of capacitor 146 may be about 3.3 µF and the value of resistor 144 may be about 7.5 k ohms. Resistor 144 and/or capacitor 146 may have other suitable values. Internal shunt regulator 150a may provide in some embodiments a regulated +5 VDC at DC output pin 132 of detection circuit 110a.

Electronic circuit breaker 100A may be subject to one or more types of power supply and/or detection circuit 110a failures. For example, resistor 144 of the power supply may fail in an open circuit mode, which may prevent detection circuit 110a from being powered. Resistor 144 may alternatively fail in a short circuit mode, which may cause detection circuit 110a to be damaged by exposure to high voltage. In either power supply failure mode, detection circuit 110a may be inoperable, along with self-test controller 122. In addition to a power supply failure, detection circuit 110a and/or one or more other circuits within electronic circuit breaker 100A affecting the operation of detection circuit 110a may fail because of damage caused by, e.g., an electrostatic discharge (ESD), a power surge, or a latch-up condition. Furthermore, the occurrence of a short circuit within electronic circuit breaker 100A may result in a high current drain on the internally regulated DC voltage supply that powers some or all of the internal electronic circuits of electronic circuit breaker 100A. A high current drain on shunt regulator 150a may cause the DC voltage to drop to an unusably low voltage level, such as, e.g., 1 volt or less. Under these conditions, fault circuitry 116 and/or self-test controller 122 within detection circuit 110a may be inoperable. In some known electronic circuit breakers, each of these types of failures may go undetected until, e.g., a user manually checks the known electronic circuit breaker via a PTT described above. Accordingly, a dangerous situation may exist with known electronic circuit breakers wherein a fault condition occurring within an electrical circuit intended to be protected by a known electronic circuit breaker may not be detected, leaving the electrical circuit dangerously energized.

Electronic circuit breaker 100A may remedy such a potentially dangerous situation by including a monitoring circuit 152 configured to monitor and respond to a power supply and/or detection circuit failure within electronic circuit breaker 100A In particular, monitoring circuit 152 may be configured to monitor a regulated DC voltage within electronic circuit breaker 100A. More particularly, in some embodiments, monitoring circuit 152 may be configured to monitor the regulated DC voltage at DC output pin 132 of detection circuit 110a. In other embodiments, a regulated DC voltage may be monitored at other suitable circuit nodes, terminals, or pins within electronic circuit breaker 100A Monitoring circuit 152 may include a diode 154, resistors 156, 158, and 160, a capacitor 162, and a transistor switch 164 electrically coupled as shown in FIG. 1A. That is, the SOURCE (which may provide, e.g., 120 VAC) may be electrically coupled to the gate of SCR 108 via diode 154 and resistors 156, 158, and 160. In particular, the SOURCE may be electrically coupled to the anode of diode 154, and the cathode of diode 154 may be electrically coupled to one terminal of resistor 156. Diode 154 may be used to prevent any large reverse voltages from electrically coupling to, and likely damaging, monitoring circuit 152 and possibly other circuits electrically coupled thereto. The other terminal of resistor 156 may be electrically coupled to one terminal of resistor 158, while the other terminal of resistor 158 may be electrically coupled to one terminal of resistor 160. The other terminal of resistor 160 may be electrically coupled to the gate of SCR 108. Capacitor 162, described in more detail further below, may have one terminal electrically coupled to a node 157 that electrically couples resistor 156 to resistor 158, and the other terminal electrically coupled to electronics ground potential. A collector of an NPN transistor 165 of transistor switch 164 may be electrically coupled to a node 159 at which resistor 158 may be coupled to resistor 160. An emitter of NPN transistor 165 may be electrically coupled to electronics ground potential.

Transistor switch 164 may also include a resistor divider network electrically coupled to the base of NPN transistor 165. The resistor divider network may include resistors 166 and 167. Resistor 166 may electrically couple the base of NPN transistor 165 to an external pin 168 of transistor switch 164, and resistor 167 may form the resistor divider by electrically coupling the base of NPN transistor 165 to the emitter of NPN transistor 165. In this embodiment, the value of resistor 166 may equal the value of resistor 167, which may each be, e.g., about 47 k ohms. This may result in a turn-on voltage of NPN transistor 165 of about 1.4 volts. The turn on voltage may be adjusted by selecting different values of resistor 166 and resistor 167. External pin 168 of transistor switch 164 may be electrically coupled to DC output pin 132 of detection circuit 110a. In some embodiments, transistor switch 164 may be, e.g., Part No. DTC144EMT2L by Rohm Co., Ltd., of Kyoto, Japan. Other transistor switches suitable for switching applications as described herein may be used instead.

In other embodiments, monitoring circuit 152 may alternatively or additionally include other suitable circuit components configured to monitor and respond to power supply and/or detection circuit failures within electronic circuit breaker 100A as described herein.

When the power supply (full wave bridge rectifier 142, resistor 144, and capacitor 146) and detection circuit 110a of electronic circuit breaker 100A are functioning normally, the internally regulated DC voltage at DC output pin 132 may be, e.g., about +5 VDC. Other suitable regulated DC voltages may be output at DC output pin 132. With external pin 168 electrically coupled to DC output pin 132, NPN transistor 165 may be on (i.e., conducting current from its collector to its emitter through a low on-resistance path). While NPN transistor 165 is on, the SOURCE may be electrically coupled to electronics ground potential via diode 154, resistor 156, resistor 158, and NPN transistor 165. This may prevent an electrical signal from the SOURCE electrically coupling to the gate of SCR 108 during normal operation, which may prevent SCR 108 from turning on (i.e., conducting) and causing trip switch 105 to open, which would disconnect the SOURCE from the LOAD. A purpose of resistor 160 may be to prevent the gate of SCR 108 from being electrically coupled directly to electronics ground potential. By preventing such a direct electrical coupling, a trip signal from trip pin 118 of detection circuit 110a may be allowed to turn on SCR 108 during normal operation so electronic circuit breaker 100A may trip as described above when either a fault condition in the LOAD is detected, a successful PTT button press is made or, in some embodiments, a failed automatic self-test occurs.

Capacitor 162 may be used to delay a power signal from the SOURCE from electrically coupling to the gate of SCR 108 in order to allow the internally regulated DC voltage electrically coupled to the base of NPN transistor 165 to first rise to the turn-on voltage of NPN transistor 165. This may be required to ensure that a power signal from the SOURCE is electrically coupled to electronics ground potential when electronic circuit breaker 100A is powering on during normal operation, and not to the gate of SCR 108, which would prematurely trip electronic circuit breaker 100A. In some embodiments, capacitor 162 may be about 0.47 µF, but may have other suitable values.

Should resistor 144 fail or should detection circuit 110a become damaged resulting in electronic circuit breaker 100A being inoperable as described above, the internally regulated DC voltage at DC output pin 132 may drop below a predetermined voltage level, such as, e.g., 1 volt. This may cause NPN transistor 165 to turn off, which in turn may electrically couple the SOURCE (providing, e.g., about 120 VAC) to the gate of SCR 108 through diode 154, resistor 156, resistor 158, and resistor 160. The values of these resistors may be selected to allow enough current (e.g., >200 uA) into the gate of SCR 108 to trigger SCR 108 to turn on and thus energize trip solenoid 106, opening trip switch 105 as described above. A dangerous situation may thus be avoided. In some embodiments, resistor 156 may be about 150 k ohms, resistor 158 may be about 10 k ohms, and resistor 160 may be about 10 k ohms. Other suitable values may be used in other embodiments.

Electronic circuit breaker 100A may further include, as shown in FIG. 1A, a varistor 170, capacitors 171 and 172, and resistor 173. In some embodiments, varistor 170 may be, e.g., Part No. ERZV11A331 by Panasonic Corporation of North America, capacitor 171 may be about 1000 pF, capacitor 172 may be about 0.1 µF, and resistor 173 may be about 4.02 k ohms. Other suitable varistors and/or values for capacitors 171 and 172 and resistor 173 may be used.

Figure 1B:
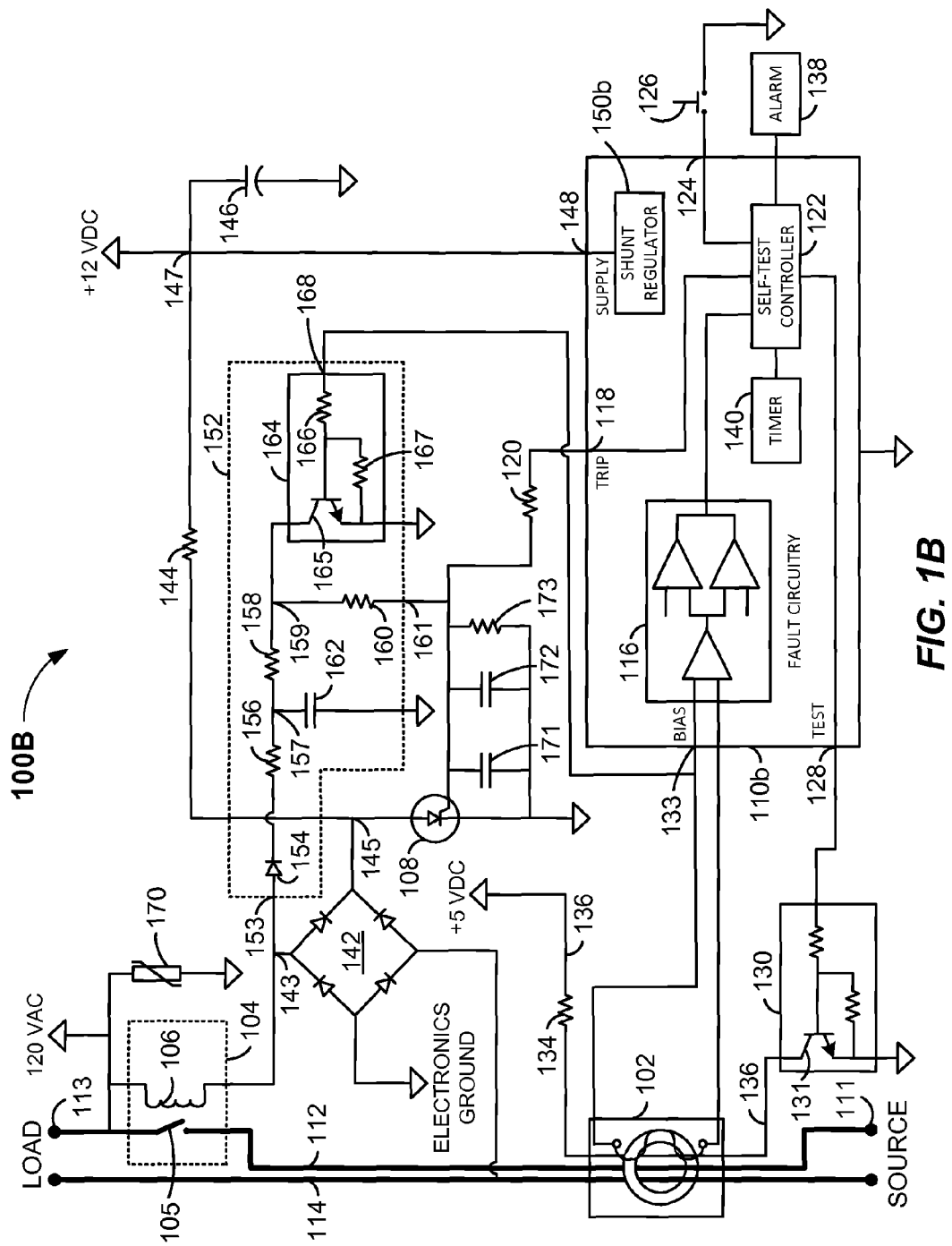
FIG. 1B illustrates a schematic circuit diagram of a second electronic circuit breaker according to embodiments.

FIG. 1B illustrates an electronic circuit breaker 100B in accordance with one or more embodiments. Electronic circuit breaker 100B may be identical or substantially similar to electronic circuit breaker 100A of FIG. 1A except as herein described. Unlike detection circuit 110a of electronic circuit breaker 100A, detection circuit 110b of electronic circuit breaker 100B may not have a DC output pin, such as DC output pin 132 of detection circuit 110a, coupled to a shunt regulator 150b. Monitoring circuit 152 of electronic circuit breaker 100B may therefore instead monitor an alternative output or pin with a DC bias or known signal. As shown in FIG. 1B, external pin 168 of transistor switch 164 may be alternatively electrically coupled to a pin 133 of detection circuit 110b, which may have a DC bias. Pin 133 may be coupled to fault circuitry 116 as shown.

When the power supply (full wave bridge rectifier 142, resistor 144, and capacitor 146) and detection circuit 110b of electronic circuit breaker 100B are functioning normally, the DC bias voltage at pin 133 may be about +2 VDC. Other suitable values of DC bias voltage may alternatively be at pin 133. With external pin 168 electrically coupled to pin 133 having a DC bias voltage of about +2 VDC, NPN transistor 165, as discussed above, may be on (i.e., conducting current from its collector to its emitter through a low on-resistance path). While NPN transistor 165 is on, the SOURCE may be electrically coupled to electronics ground potential via diode 154, resistor 156, resistor 158, and NPN transistor 165. This may prevent an electrical signal from the SOURCE electrically coupling to the gate of SCR 108 during normal operation, which may prevent SCR 108 from turning on (i.e., conducting) and causing trip switch 105 to open, which would disconnect the SOURCE from the LOAD.

Should resistor 144 fail or should detection circuit 110b become damaged resulting in electronic circuit breaker 100B being inoperable as described above, the internally regulated DC voltage may drop below a predetermined voltage level, such as, e.g., 1 volt, and thus also the DC bias voltage at pin 133. This may cause NPN transistor 165 to turn off, which in turn may electrically couple the SOURCE (providing, e.g., about 120 VAC) to the gate of SCR 108 through diode 154, resistor 156, resistor 158, and resistor 160 which, as described above, may trigger SCR 108 to turn on and thus energize trip solenoid 106, causing trip switch 105 to open. A dangerous situation may thus again be avoided.

Figure 2:
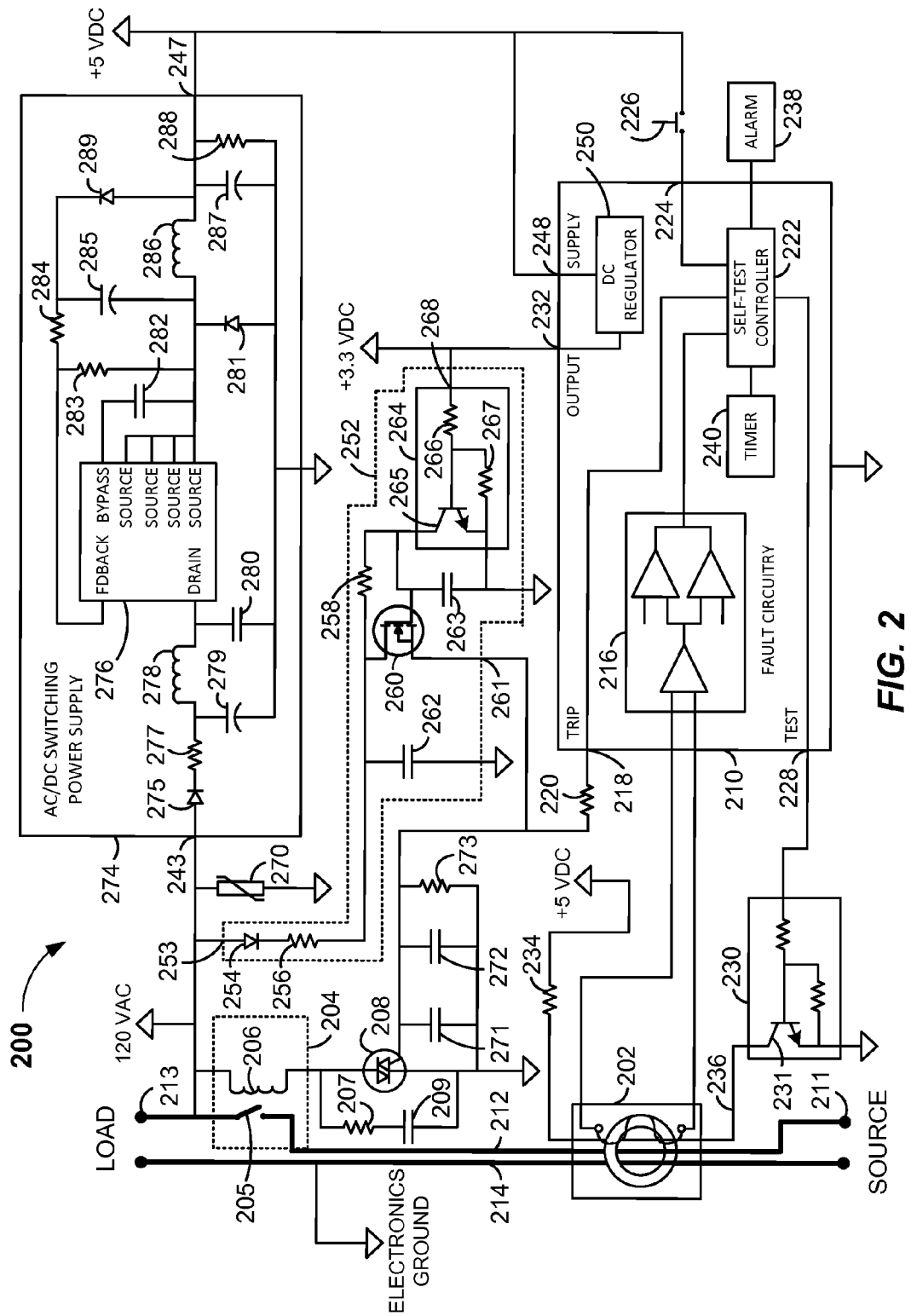
FIG. 2 illustrates a schematic circuit diagram of a third electronic circuit breaker according to embodiments.

FIG. 2 illustrates an electronic circuit breaker 200 in accordance with one or more embodiments. Electronic circuit breaker 200 may be a ground fault circuit interrupter (GFCI) coupled between an AC electrical power source and an electrical circuit (respectively labeled "SOURCE" and "LOAD" in FIG. 2). The SOURCE may provide, e.g., 120 VAC, and the LOAD may be an electrical circuit including, e.g., one or more appliances, lighting fixtures, and/or other electrical equipment. In some embodiments, the SOURCE may provide other values of AC voltage.

Electronic circuit breaker 200 may include a current transformer 202, a trip mechanism 204, a TRIAC 208, a transistor switch 230, and a detection circuit 210, which may be fabricated as, or part of, an ASIC. Detection circuit 210 may be configured to detect ground faults and/or, alternatively or additionally, other types of fault conditions, such as, e.g., arc faults, over currents, and/or short circuits. Current transformer 202 may be coupled to a power conductor 212 and a neutral conductor 214. Trip mechanism 204 may include a trip switch 205 and a trip solenoid 206, wherein trip switch 205 may be configured to electrically couple and decouple AC power from the SOURCE to the LOAD via power conductor 212 (i.e., trip switch 205 may be configured to open and close a current path in power conductor 112 between the SOURCE and the LOAD). During normal operation (i.e., where no fault conditions are detected), trip switch 205 may be closed, electrically coupling the SOURCE to the LOAD.

Except as otherwise described below, current transformer 202, trip mechanism 204, transistor switch 230, and detection circuit 210 may operate identically or substantially similarly as current transformer 102, trip mechanism 104, transistor switch 130, and detection circuit 110a, respectively. In particular, fault circuitry 216, trip pin 218, resistors 220 and 234, test pin 228, NPN transistor 231, conductor 236, alarm 238, timer 240, supply pin 248, and DC voltage regulator 250 may each operate and/or function identically or substantially similarly as fault circuitry 116, trip pin 118, resistors 120 and 134, test pin 128, NPN transistor 131, conductor 136, alarm 138, timer 140, supply pin 148, and shunt regulator 150a, respectively. Note that self-test controller 222, PTT pin 224, and PTT button 226 may operate and/or function identically or substantially similarly as self-test controller 122, PTT pin 124, and PTT button 126 except that pressing manually-operated PTT button 226 may electrically couple PTT pin 224 to +5 VDC (instead of electronics ground potential as in electronic circuit breaker 100A) to which self-test controller 222 may respond by momentarily outputting a signal at test pin 228.

Electronic circuit breaker 200 may include an AC/DC switching power supply 274 that may be configured to convert an AC voltage (e.g., 120 VAC) received from the SOURCE to about +5 VDC. AC/DC switching power supply 274 may perform half-wave rectification and may include diode 275, power supply ASIC 276, and supporting electrical components including resistors 277, 283, 284, and 288; inductors 278 and 286; capacitors 279, 280, 282, 285, and 287; and diodes 281 and 289. Power supply ASIC 276 may be, e.g., Part No. LNK562DN-TL by Power Integrations, Inc. of San Jose, Calif. Other suitable AC/DC power supply ASICs may be alternatively used.

TRIAC 208 may be used in electronic circuit breaker 200 to energize trip solenoid 206 on either the positive or negative half cycle in order to meet a trip time requirement of about 25 mS when electronic circuit breaker 200 is powered with a 500-ohm ground fault occurring on the LOAD. In comparison with electronic circuit breaker 100A of FIG. 1A, where the power supply is full wave rectified instead of half-wave rectified, electronic circuit breaker 200 includes TRIAC 208 instead of SCR 108 to energize trip solenoid 206 within a prescribed trip time requirement. TRIAC 208 may be, e.g., Part No. Z0103NA2AL2 by ST Microelectronics, of Geneva, Switzerland. Other suitable TRIACs may be used instead.

In some embodiments, a "snubber" circuit including a resistor 207 and a capacitor 209 may be required to prevent TRIAC 208 from turning on prematurely in the presence of high voltage transients on the AC voltage received from the SOURCE. As shown in FIG. 2, one terminal of TRIAC 208 may be electrically coupled to one terminal of resistor 207, while the other terminal of resistor 207 may be electrically coupled to one terminal of capacitor 209. The other terminal of capacitor 209 may be electrically coupled to the other terminal of TRIAC 208, forming the snubber circuit.

TRIAC 208 may have a much higher gate trigger current than SCR 108 of electronic circuit breaker 100A. In some embodiments, TRIAC 208 may have a gate trigger current of about 3 mA. Compared to the 200 uA gate trigger current of SCR 108, much more current may be required to electrically couple the SOURCE to the gate of TRIAC 208 in order to energize trip solenoid 206. Accordingly, much more current may need to be shunted to electronics ground during normal operation wherein TRIAC 208 is off (i.e., non-conductive).

To accommodate the increased current requirements of TRIAC 208 and also remedy a potentially dangerous situation caused by a failure in AC/DC switching power supply 274 and/or detection circuit 210, electronic circuit breaker 200 may include a monitoring circuit 252. Monitoring circuit 252 may be configured to monitor and respond to a power supply and/or detection circuit failure within electronic circuit breaker 200. In particular, monitoring circuit 252 may be configured to monitor a regulated DC voltage within electronic circuit breaker 200. More particularly, in some embodiments, monitoring circuit 252 may be configured to monitor the regulated DC voltage at a DC output pin 232 of detection circuit 210. In other embodiments, a regulated DC voltage may be monitored at other suitable circuit nodes, terminals, or pins within electronic circuit breaker 200.

Monitoring circuit 252 may include a diode 254, resistors 256 and 258, an N-channel MOSFET (metal oxide semiconductor field effect transistor) 260, capacitors 262 and 263, and a transistor switch 264 electrically coupled as shown in FIG. 2. That is, the SOURCE (which may provide, e.g., 120 VAC) may be electrically coupled to the gate of TRIAC 208 via diode 254, resistor 256, and MOSFET 260. In particular, the SOURCE may be electrically coupled to the anode of diode 254, and the cathode of diode 254 may be electrically coupled to one terminal of resistor 256. Diode 254 may be used to prevent any large reverse voltages from electrically coupling to, and likely damaging, monitoring circuit 252 and possibly other circuits electrically coupled thereto. The other terminal of resistor 256 may be electrically coupled to a drain of MOSFET 260, which may also be electrically coupled to one terminal of capacitor 262. The other terminal of capacitor 262 may be electrically coupled to an electronics ground potential of electronic circuit breaker 200. Capacitor 262 may filter high voltage transients to prevent damage to MOSFET 260. In some embodiments, capacitor 262 may be about 0.01 µF, but may have other suitable values. Capacitor 263, described in more detail further below, may have one terminal electrically coupled to a gate of MOSFET 260 and the other terminal electrically coupled to electronics ground potential. A source of MOSFET 260 may be electrically coupled to the gate of TRIAC 208. The drain of MOSFET 260 may further be electrically coupled to one terminal of resistor 258. MOSFET 260 may have a turn-on voltage Vgs ranging from 3 volts to 4.5 volts and may be, e.g., Part No. BSS127S-7 by Diodes Incorporated, of Plano, Tex. Other suitable N-channel MOSFETS may be used instead. The other terminal of resistor 258 may be electrically coupled to the gate of MOSFET 260 and to a collector of an NPN transistor 265 of transistor switch 264. An emitter of NPN transistor 265 may be electrically coupled to electronics ground potential.

Transistor switch 264 may also include a resistor divider network electrically coupled to the base of NPN transistor 265. The resistor divider network may include resistors 266 and 267. Resistor 266 may electrically couple the base of NPN transistor 265 to an external pin 268 of transistor switch 264, and resistor 267 may form the resistor divider by electrically coupling the base of NPN transistor 265 to the emitter of NPN transistor 265. In this embodiment, the value of resistor 266 may equal the value of resistor 267, which may each be, e.g., about 47 k ohms. This may result in a turn-on voltage of NPN transistor 265 of about 1.4 volts. The turn on voltage may be adjusted by selecting different values of resistor 266 and resistor 267. External pin 268 of transistor switch 264 may be electrically coupled to DC output pin 232 of detection circuit 210. In some embodiments, transistor switch 264 may be, e.g., Part No. DTC144EMT2L by Rohm Co., Ltd., of Kyoto, Japan. Other transistor switches suitable for switching applications as described herein may be used instead.

In other embodiments, monitoring circuit 252 may alternatively or additionally include other suitable circuit components configured to monitor and respond to power supply and/or detection circuit failures within electronic circuit breaker 200 as described herein.

When AC/DC switching power supply 274 and detection circuit 210 of electronic circuit breaker 200 are functioning normally, the internally regulated DC voltage at DC output pin 232 may be, e.g., about +3.3 VDC. Other suitable regulated DC voltages may be output at DC output pin 232. With external pin 268 electrically coupled to DC output pin 232, NPN transistor 265 may be on (i.e., conducting current from its collector to its emitter through a low on-resistance path). While NPN transistor 265 is on, the gate of MOSFET 260 may be electrically coupled to electronics ground potential, thus turning off MOSFET 260 and preventing any electrical signal from the SOURCE electrically coupling to the gate of TRIAC 208 during normal operation. This may prevent TRIAC 208 from turning on (i.e., conducting), energizing trip solenoid 206, and causing trip switch 205 to open, which would disconnect the SOURCE from the LOAD.

Capacitor 263 may be used to delay a power signal from the SOURCE from electrically coupling to the gate of MOSFET 260 in order to allow the internally regulated DC voltage electrically coupled to the base of NPN transistor 265 to first rise to the turn-on voltage of NPN transistor 265. This may be required to ensure that MOSFET 260 stays off, preventing power from the SOURCE from electrically coupling to the gate of TRIAC 208 when electronic circuit breaker 200 is powering on during normal operation, which would prematurely trip electronic circuit breaker 200. In some embodiments, capacitor 263 may be about 0.47 µF, but may have other suitable values.

Should any one of more of diode 275, resistor 277, power supply ASIC 276, or any critical components around power supply ASIC 276 fail that would cause AC/DC switching power supply 274 to be inoperable, or should detection circuit 210 become damaged internally resulting in detection circuit 210 becoming inoperable as described above in connection with electronic circuit breaker 100A, the internally regulated DC voltage at DC output pin 232 may drop below a predetermined voltage level, such as, e.g., 1 volt. This may cause NPN transistor 265 to turn off, which may cause MOSFET 260 to turn on and electrically couple the SOURCE (providing, e.g., about 120 VAC) to the gate of TRIAC 208 through diode 254, resistor 256, and MOSFET 260. The value of resistor 256 may be selected to allow enough current (>3 mA) into the gate of TRIAC 208 to trigger TRIAC 208 to turn on and thus energize trip solenoid 206, opening trip switch 205. A dangerous situation may thus be avoided. In some embodiments, resistor 256 may be about 10 k ohms and resistor 258 may be about 402 k ohms. Other suitable values may be used in other embodiments.

Electronic circuit breaker 200 may further include, as shown in FIG. 2, a varistor 270, capacitors 271 and 272, and resistor 273. In some embodiments, varistor 270 may be, e.g., Part No. ERZV11A331 by Panasonic Corporation of North America, capacitor 271 may be about 1000 pF, capacitor 272 may be about 0.1 µF, and resistor 273 may be about 4.02 k ohms. Other suitable varistors and/or values for capacitors 271 and 272 and resistor 273 may be used.

Figure 3:
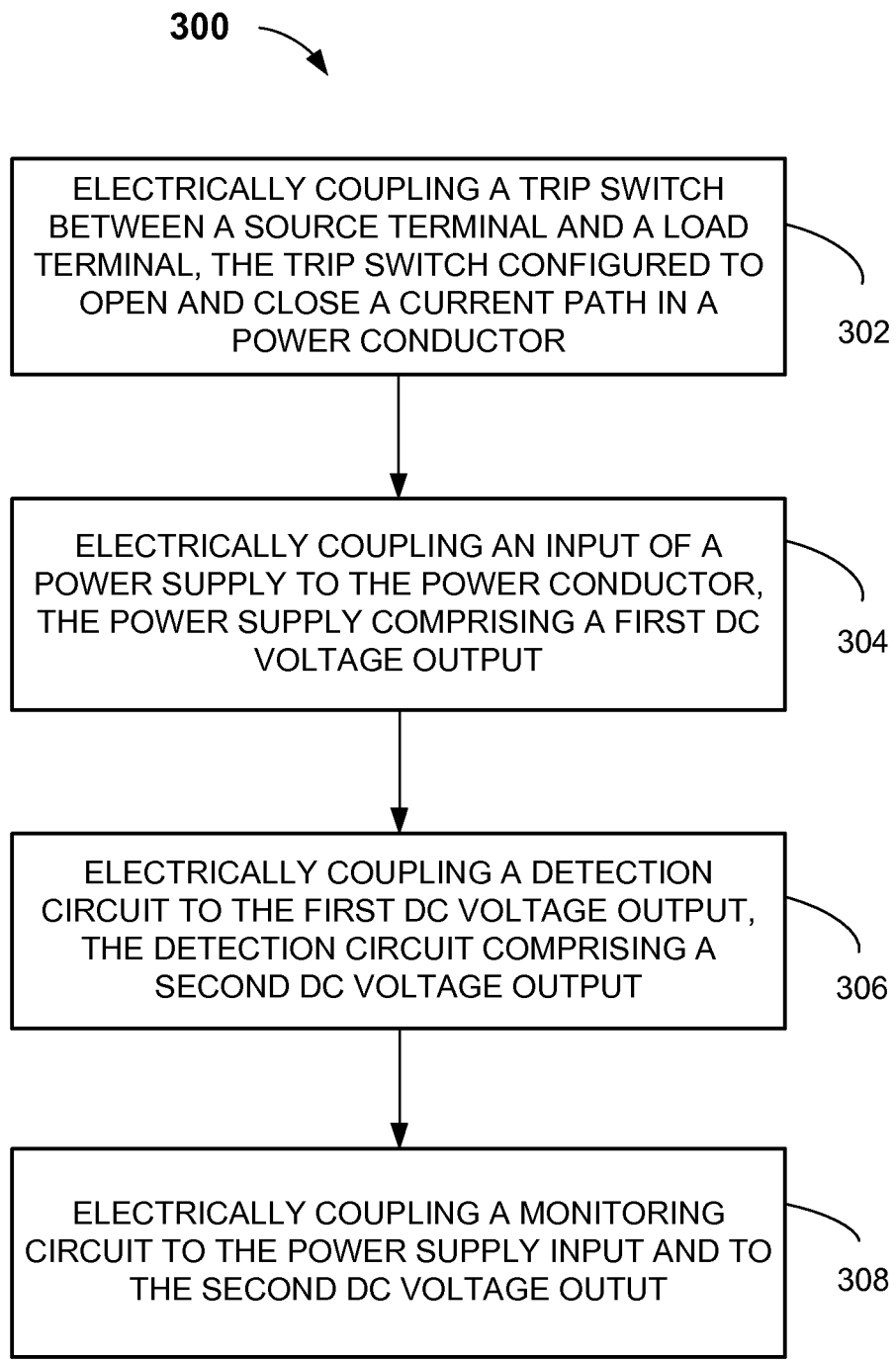
FIG. 3 illustrates a flowchart of a method of assembling an electronic circuit breaker configured to monitor and respond to a power supply and/or detection circuit failure within the electronic circuit breaker according to embodiments.

FIG. 3 illustrates a flowchart of a method 300 of assembling an electronic circuit breaker configured to monitor and respond to a power supply and/or detection circuit failure within the electronic circuit breaker in accordance with one or more embodiments. Method 300 may include at process block 302 electrically coupling a trip switch between a source terminal and a load terminal of the electronic circuit breaker, wherein the trip switch is configured to open and close a current path in a power conductor between the source terminal and the load terminal. For example, as shown in FIG. 1A, electronic circuit breaker 100A may have trip switch 105 electrically coupled between a source terminal 111 and a load terminal 113, wherein trip switch 105 may be configured to open and close a current path in power conductor 112 between source terminal 111 and load terminal 113. Similarly, as shown in FIG. 2, electronic circuit breaker 200 may have trip switch 205 electrically coupled between a source terminal 211 and a load terminal 213, wherein trip switch 205 may be configured to open and close a current path in power conductor 212 between source terminal 211 and load terminal 213.

At process block 304, method 300 may include electrically coupling an input of a power supply to the power conductor, wherein the power supply is configured to convert an AC voltage into a first DC voltage and comprises a first DC voltage output. In some embodiments, as shown in FIG. 1A, the power supply comprising full wave bridge rectifier 142, resistor 144, and capacitor 146 may have an input at node 143 electrically coupled to power conductor 112 (via trip solenoid 106) and a first DC voltage output at node 147. Similarly, as shown in FIG. 2, AC/DC switching power supply 274 may have an input at input pin 243 electrically coupled to power conductor 212 and a first DC voltage output at output pin 247.

At process block 306, method 300 may include electrically coupling a detection circuit to the first DC voltage output, wherein the detection circuit comprises a second DC voltage output. The detection circuit may be, e.g., detection circuit 110a of electronic circuit breaker 100A, detection circuit 110b of electronic circuit breaker 100B, or detection circuit 210 of electronic circuit breaker 200. As shown in FIG. 1A, supply pin 148 of detection circuit 110a may be electrically coupled to node 147 (i.e., the first DC voltage output) of the power supply of electronic circuit breaker 100A and, as shown in FIG. 2, supply pin 248 of detection circuit 210 may be electrically coupled to output pin 247 (i.e., the first DC voltage output) of AC/DC switching power supply 274. Detection circuit 110a may have a second DC voltage output at DC output pin 132, detection circuit 110b may have a second DC voltage output at pin 133, and detection circuit 210 may have a second DC voltage output at DC output pin 232. Alternatively, any suitable detection circuit capable of detecting one or more of the fault conditions described above and having a suitable DC voltage output may be used.

At process block 308, method 300 may include electrically coupling a monitoring circuit to the power supply input and to the second DC voltage output, wherein the monitoring circuit is configured to respond to a power supply or detection circuit failure by causing the trip switch to open the current path between the source terminal and the load terminal. The monitoring circuit may be, e.g., monitoring circuit 152 of electronic circuit breaker 100A or 100B or monitoring circuit 252 of electronic circuit breaker 200. As shown in FIG. 1A, the anode of diode 154 of monitoring circuit 152 may be electrically coupled to node 143 (i.e., the power supply input) and external pin 168 of transistor switch 164 of monitoring circuit 152 may be electrically coupled to DC output pin 132 of detection circuit 110a (i.e., the second DC voltage output). Alternatively, as shown in FIG. 1B, external pin 168 of transistor switch 164 of monitoring circuit 152 may be electrically coupled to pin 133 of detection circuit 110b (i.e., the second DC voltage output). And as shown in FIG. 2, the anode of diode 254 of monitoring circuit 252 may be electrically coupled to input pin 243 of AC/DC switching power supply 274 and external pin 268 of transistor switch 264 of monitoring circuit 252 may be electrically coupled to DC output pin 232 of detection circuit 210 (i.e., the second DC voltage output).

In some embodiments, the electrical coupling of a monitoring circuit may include electrically coupling a first pin of the monitoring circuit to the power supply input, electrically coupling a second pin of the monitoring circuit to the second DC voltage output of the detection circuit, and electrically coupling a third pin of the monitoring circuit to a control circuit configured to control the opening (and in some embodiments the closing) of the trip switch (e.g., trip switch 105 and/or 205). For example, in those embodiments wherein monitoring circuit 152 may be fabricated as an IC, a first pin 153 of monitoring circuit 152 may be electrically coupled to node 143 of electronic circuit breaker 100A or 100B, external pin 168 of transistor switch 164 of monitoring circuit 152 may serve as a second pin of monitoring circuit 152 and may be electrically coupled to DC output pin 132 or pin 133, and a third pin 161 of monitoring circuit 152 may be electrically coupled to a control circuit comprising SCR 108, capacitors 171 and 172 and resistor 173. Similarly, in some embodiments, monitoring circuit 252 may be fabricated as an IC wherein a first pin 253 of monitoring circuit 252 may be electrically coupled to input pin 243 of AC/DC switching power supply 274, external pin 268 of transistor switch 264 of monitoring circuit 252 may serve as a second pin of monitoring circuit 252 and may be electrically coupled to DC output pin 232, and a third pin 261 of monitoring circuit 252 may be electrically coupled to a control circuit comprising TRIAC 208, capacitors 271 and 272 and resistor 273.

Note that the above process blocks of method 300 may be executed or performed in an order or sequence not limited to the order and sequence shown and described. For example, in some embodiments, process block 302 may be performed after or in parallel with process block 304 and/or process block 306.

Figure 4:
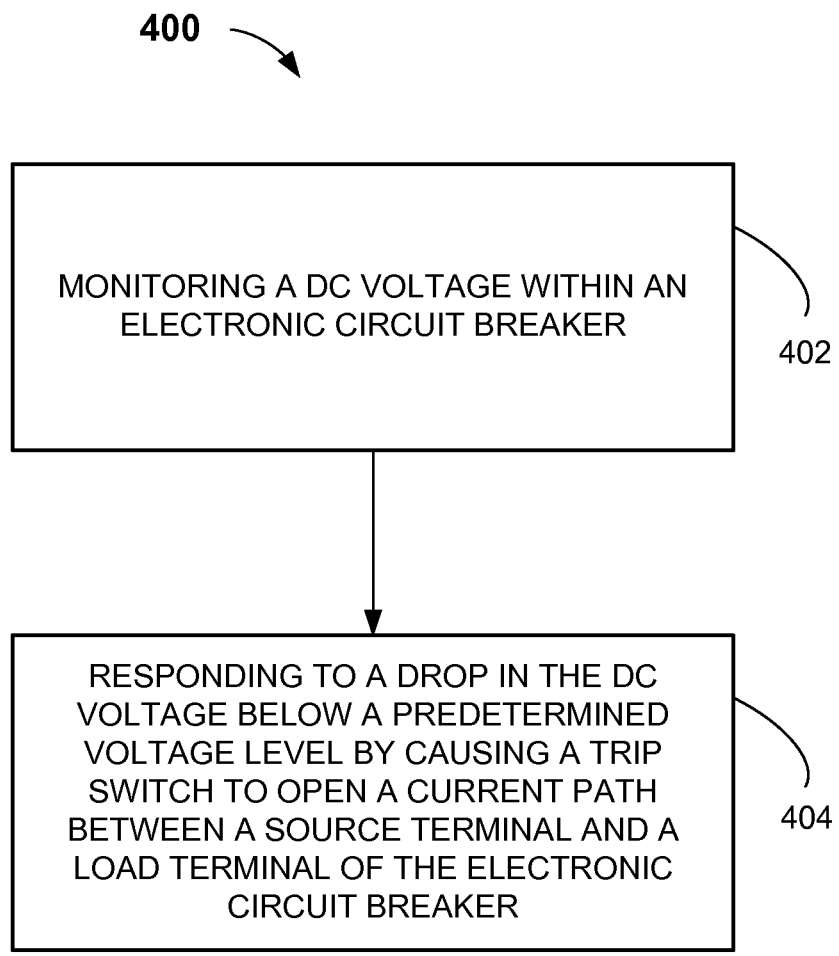
FIG. 4 illustrates a flowchart of a method of monitoring and responding to a power supply and/or detection circuit failure within an electronic circuit breaker according to embodiments.

FIG. 4 illustrates a flowchart of a method 400 of detecting and responding to a power supply and/or a detection circuit failure within an electronic circuit breaker in accordance with one or more embodiments. Method 400 may include at process block 402 monitoring a DC voltage within an electronic circuit breaker. For example, in some embodiments, monitoring circuit 152 may be used to monitor the DC voltage provided at DC output pin 132 of detection circuit 110a in electronic circuit breaker 100A or the DC voltage provided at pin 133 of detection circuit 110b in electronic circuit breaker 100B. In other embodiments, monitoring circuit 252 may be used to monitor the DC voltage provided at DC output pin 232 of detection circuit 210 in electronic circuit breaker 200. Alternatively, monitoring circuit 152 and/or monitoring circuit 252 may be used to monitor a DC voltage provided at another suitable circuit node, terminal, or pin within an electronic circuit breaker.

At process block 404, method 400 may include responding to a drop in the DC voltage below a predetermined voltage level by causing a trip switch to open a current path between a source terminal and a load terminal of the electronic circuit breaker. As described above in connection with electronic circuit breaker 100A, e.g., the predetermined voltage level may be 1 volt or less in some embodiments. Should the DC voltage at DC output pin 132 drop to 1 volt or less, monitoring circuit 152 may respond by causing trip switch 105 to open the current path in power conductor 112 between source terminal 111 and load terminal 113 of electronic circuit breaker 100A, as shown in FIG. 1A.

More particularly, in some embodiments, a drop in DC voltage at DC output pin 132 to 1 volt or less may cause NPN transistor 165 to turn off, which may divert a current via diode 154 and resistors 156, 158, and 160, as described above, to a control circuit. The control circuit may include SCR 108, capacitors 171 and 172, and resistor 173. The current diverted to SCR 108 may cause SCR 108 to turn on, which may energize trip solenoid 106 (or, alternatively, an electromagnet). An energized trip solenoid 106 may cause trip switch 105 to open, which opens the current path between source terminal 111 and load terminal 113 of electronic circuit breaker 100A. Note that while the DC voltage remains above the predetermined voltage level at DC output pin 132, NPN transistor 165 may remain on, which may shunt a current to electronics ground potential that would otherwise be diverted to SCR 108.

Persons skilled in the art should readily appreciate that the invention described herein is susceptible of broad utility and application. Many embodiments and adaptations of the invention other than those described herein, as well as many variations, modifications, and equivalent arrangements, will be apparent from, or reasonably suggested by, the invention and the foregoing description thereof, without departing from the substance or scope of the invention. For example, although described in connection with monitoring a DC voltage in an electronic circuit breaker, the monitoring circuits and methods described herein may have application in other electronic devices wherein an internal power supply failure may be mitigated to avoid undesirable or possibly dangerous consequences. Accordingly, while the invention has been described herein in detail in relation to specific embodiments, it should be understood that this disclosure is only illustrative and presents examples of the invention and is made merely for purposes of providing a full and enabling disclosure of the invention. This disclosure is not intended to limit the invention to the particular apparatus, devices, assemblies, systems or methods disclosed, but, to the contrary, the intention is to cover all modifications, equivalents, and alternatives falling within the scope of the invention, as defined by the following claims.

What is claimed is:

1. An electronic circuit breaker, comprising:
   a trip switch configured to open and close a current path between an electrical power source and an electrical circuit;
   a detection circuit configured to detect and respond to a fault condition in the electrical circuit, the detection circuit configured to respond to a fault condition by causing the trip switch to open the current path between the electrical power source and the electrical circuit;
   a power supply configured to convert an AC voltage received from the electrical power source into a first DC voltage, the power supply providing the first DC voltage to the detection circuit; and
   a monitoring circuit coupled to receive and monitor a second DC voltage from the detection circuit, wherein the monitoring circuit is configured to respond to a power supply or detection circuit failure within the electronic circuit breaker by causing the trip switch to open the current path between the electrical power source and the electrical circuit, and wherein a predetermined voltage level of the second DC voltage indicates no failure of the power supply or detection circuit.

2. The electronic circuit breaker of claim 1, wherein the second DC voltage is derived from the first DC voltage within the electronic circuit breaker.

3. The electronic circuit breaker of claim 1, wherein the second DC voltage is provided at an output of the detection circuit and is a regulated DC voltage.

4. The electronic circuit breaker of claim 1, wherein the monitoring circuit is configured to respond to a drop in the first or second DC voltage below the predetermined voltage level by causing the trip switch to open the current path between the electrical power source and the electrical circuit.

5. The electronic circuit breaker of claim 1 wherein the monitoring circuit comprises:
   a first pin electrically coupled to receive an AC voltage from the electrical power source;
   a second pin electrically coupled to receive the first DC voltage or the second DC voltage; and
   a third pin electrically coupled to a control circuit to cause the trip switch to open the current path between the electrical power source and the electrical circuit.

6. The electronic circuit breaker of claim 1, wherein the monitoring circuit comprises a transistor configured to shunt a current to ground while the second DC voltage remains above the predetermined voltage level.

7. The electronic circuit breaker of claim 1, wherein the monitoring circuit is fabricated as an integrated circuit.

8. The electronic circuit breaker of claim 1, wherein the detection circuit is configured to detect a fault condition comprising at least one of a ground fault, an arc fault, an over current condition, and a short circuit condition.

9. The electronic circuit breaker of claim 1 wherein an application specific integrated circuit comprises the detection circuit, the detection circuit comprising a DC voltage or shunt regulator.

10. A method of assembling an electronic circuit breaker configured to monitor and respond to a power supply and/or a detection circuit failure within the electronic circuit breaker, the method comprising:
    electrically coupling a trip switch between a source terminal and a load terminal, the trip switch configured to open and close a current path in a power conductor between the source terminal and the load terminal;
    electrically coupling an input of a power supply to the power conductor, the power supply configured to convert an AC voltage into a first DC voltage and comprising a first DC voltage output;
    electrically coupling a detection circuit to the first DC voltage output, the detection circuit comprising a second DC voltage output; and
    electrically coupling a monitoring circuit to the power supply input and to the second DC voltage output, wherein the monitoring circuit is configured to respond to a power supply or detection circuit failure by causing the trip switch to open the current path between the source terminal and the load terminal, and wherein a predetermined voltage level at the second DC voltage output indicates no failure of the power supply or detection circuit.

11. The method of claim 10 further comprising electrically coupling the monitoring circuit to a control circuit configured to control the opening and closing of the trip switch.

12. The method of claim 10 further comprising electrically coupling a control circuit to the trip switch, the detection circuit, and the monitoring circuit, wherein the control circuit is configured to control the opening and closing of the trip switch.

13. The method of claim 12 wherein the control circuit comprises an SCR (silicon-controlled rectifier) or a TRIAC.

14. The method of claim 10 wherein the monitoring circuit is configured to monitor a DC voltage provided at the second DC voltage output of the detection circuit and to respond to a drop in the DC voltage below the predetermined voltage level by causing the trip switch to open the current path between the source terminal and the load terminal.

15. The method of claim 10, wherein the electrically coupling a monitoring circuit comprises:
    electrically coupling a first pin of the monitoring circuit to the power supply input;
    electrically coupling a second pin of the monitoring circuit to the second DC voltage output of the detection circuit; and electrically coupling a third pin of the monitoring circuit to a control circuit configured to control the opening and closing of the trip switch.

16. A method of detecting and responding to a power supply and/or a detection circuit failure within an electronic circuit breaker, the method comprising:
    monitoring a DC voltage received from a detection circuit within the electronic circuit breaker, the detection circuit operable to detect at least one of a ground fault or an arc fault, and a predetermined voltage level of the DC voltage indicates no failure of the power supply or detection circuit; and
    responding to a drop in the DC voltage below the predetermined voltage level by causing a trip switch to open a current path between a source terminal and a load terminal of the electronic circuit breaker.

17. The method of claim 16 further comprising shunting a current to ground while the DC voltage remains above the predetermined voltage level.

18. The method of claim 16 wherein the monitoring a DC voltage comprises monitoring a regulated DC voltage provided at an output of a detection circuit within the electronic circuit breaker.

19. The method of claim 16 wherein the responding to a drop in the DC voltage comprises:
    turning off a transistor electrically coupled to receive the DC voltage;
    diverting a current to a control circuit;
    energizing a trip solenoid or electromagnet; and
    opening the trip switch to open the current path between the source terminal and the load terminal of the electronic circuit breaker.

20. The method of claim 19 wherein the diverting a current to a control circuit comprises diverting the current to an SCR (silicon-controlled rectifier) or a TRIAC to turn on the SCR or TRIAC.

* * * * *